US009625346B2

(12) United States Patent
Nienhoff et al.

(10) Patent No.: US 9,625,346 B2
(45) Date of Patent: Apr. 18, 2017

(54) METHOD AND DEVICE FOR CHECKING THE HYDRAULIC LEAK-TIGHTNESS IN AN EXHAUST GAS AFTERTREATMENT SYSTEM FOR A MOTOR VEHICLE

(71) Applicant: Continental Automotive GmbH, Hannover (DE)

(72) Inventors: Michael Nienhoff, Regensburg (DE); Paul Rodatz, Landshut (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 214 days.

(21) Appl. No.: 14/405,515

(22) PCT Filed: Jun. 5, 2013

(86) PCT No.: PCT/EP2013/061623
§ 371 (c)(1),
(2) Date: Dec. 4, 2014

(87) PCT Pub. No.: WO2013/182617
PCT Pub. Date: Dec. 12, 2013

(65) Prior Publication Data
US 2015/0153244 A1 Jun. 4, 2015

(30) Foreign Application Priority Data
Jun. 6, 2012 (DE) .......... 10 2012 209 538

(51) Int. Cl.
*G01M 3/02* (2006.01)
*G01M 3/40* (2006.01)
(Continued)

(52) U.S. Cl.
CPC ............. *G01M 3/025* (2013.01); *F01N 3/208* (2013.01); *F01N 11/00* (2013.01);
(Continued)

(58) Field of Classification Search
CPC . G01M 3/02; G01M 3/40; G01M 3/00; F01N 11/00; F01N 3/00; F01N 3/20;
(Continued)

(56) References Cited

U.S. PATENT DOCUMENTS 4,899,573 A * 2/1990 Dimmick ............ G01M 3/3263
73/149
5,890,474 A * 4/1999 Schnaibel .......... F02M 25/0818
123/198 D
(Continued)

FOREIGN PATENT DOCUMENTS

CN 1873195 A 12/2006 ............. F01N 11/00
DE 19952830 A1 5/2001 ............. B01D 46/42
(Continued)

OTHER PUBLICATIONS

International Search Report and Written Opinion, Application No. PCT/EP2013/061623, 17 pages, Aug. 20, 2013.
(Continued)

*Primary Examiner* — Nguyen Ha
*Assistant Examiner* — 'Wyn' Ha
(74) *Attorney, Agent, or Firm* — Slayden Grubert Beard PLLC

(57) ABSTRACT

A method for checking the leak-tightness of hydraulic components in an exhaust gas aftertreament unit of an internal combustion engine is disclosed. The exhaust gas aftertreament unit uses an electric motor to pump a liquid reductant from a reductant reservoir to a reductant injector that is kept closed. The reductant pump is switched on for a first predetermined period, and the electric current consumed by the electric motor is detected during this period. After a predetermined standstill time has passed, the reductant pump is switched on again for a second period identical to the first period, and the electric current consumed by the
(Continued)

electric motor is again detected during this period. The electric currents detected during the two time periods are compared with each other, and the leak-tightness of the hydraulic components downstream of the reductant pump is evaluated based on the result of the comparison.

12 Claims, 2 Drawing Sheets

(51) Int. Cl.
*F01N 11/00* (2006.01)
*F01N 3/20* (2006.01)

(52) U.S. Cl.
CPC ...... *F01N 2390/02* (2013.01); *F01N 2550/05* (2013.01); *F01N 2900/0418* (2013.01); *F01N 2900/1822* (2013.01); *Y02T 10/24* (2013.01); *Y02T 10/47* (2013.01)

(58) Field of Classification Search
CPC .. F01N 3/208; F01N 2390/02; F01N 2550/05; F01N 1900/0418; F01N 1900/1822; Y02T 10/47; Y02T 10/24
See application file for complete search history.

(56) References Cited

U.S. PATENT DOCUMENTS

| | | | | |
|---|---|---|---|---|
| 6,131,550 A * | 10/2000 | Fritz | ................ | F02M 25/0818 123/198 D |
| 6,460,518 B1 | 10/2002 | Streib | ..................... | 123/520 |
| 7,185,486 B2 | 3/2007 | Bluhm et al. | ................... | 60/286 |
| 7,216,478 B2 | 5/2007 | Brown et al. | ................... | 60/277 |
| 2001/0029776 A1 * | 10/2001 | Streib | ................ | F02M 25/0818 73/49.2 |
| 2002/0157654 A1 * | 10/2002 | Streib | ................ | F02M 25/0818 123/520 |
| 2002/0178791 A1 * | 12/2002 | Shigihama | ......... | F02M 25/0818 73/49.2 |
| 2003/0213295 A1 * | 11/2003 | Streib | ................ | F02M 25/0818 73/114.41 |
| 2006/0090553 A1 * | 5/2006 | Nagasaki | ........... | F02M 25/0818 73/114.43 |
| 2011/0083424 A1 | 4/2011 | Wang et al. | .................... | 60/277 |
| 2012/0318368 A1 * | 12/2012 | Doughty | ............ | G01M 3/2815 137/12 |

FOREIGN PATENT DOCUMENTS

| | | | | |
|---|---|---|---|---|
| DE | 10006185 C1 | 6/2001 | ............ | F02M 25/08 |
| DE | 102009014809 B3 | 4/2010 | ............ | F01N 11/00 |
| DE | 102010047506 A1 | 6/2011 | ............ | F01N 11/00 |
| DE | 102010029852 A1 | 12/2011 | ............ | F01N 11/00 |
| DE | 102010030858 A1 | 1/2012 | ............ | F01N 11/00 |
| FR | 2920031 A1 | 2/2009 | ............ | F01N 11/00 |
| GB | 2440317 A | 1/2008 | ............ | F01N 11/00 |
| WO | 2013/182617 A1 | 12/2013 | ............ | F01N 11/00 |

OTHER PUBLICATIONS

Chinese Office Action, Application No. 201380030034.9, 11 pages, Jun. 22, 2016.

* cited by examiner

METHOD AND DEVICE FOR CHECKING THE HYDRAULIC LEAK-TIGHTNESS IN AN EXHAUST GAS AFTERTREATMENT SYSTEM FOR A MOTOR VEHICLE

CROSS-REFERENCE TO RELATED APPLICATIONS

This application is a U.S. National Stage Application of International Application No. PCT/EP2013/061623 filed Jun. 5, 2013, which designates the United States of America, and claims priority to DE Application No. 10 2012 209 538.1 filed Jun. 6, 2012, the contents of which are hereby incorporated by reference in their entirety.

TECHNICAL FIELD

The invention relates to a method and a device for checking the functionality of hydraulic components in an exhaust-gas aftertreatment system for a motor vehicle.

BACKGROUND

For the reduction of pollutants, in particular for the reduction of nitrogen oxides in exhaust gases of internal combustion engines that operate with excess of air, in particular of diesel engines, various methods have become established for the introduction of reducing fluids (gases or liquids) into the exhaust system of the internal combustion engine.

In particular, for the reduction of nitrogen oxides, SCR (selective catalytic reduction) technology has become established, wherein nitrogen oxides ($NO_x$) contained in the oxygen-rich exhaust gas are selectively reduced with the aid of ammonia ($NH_3$), or a corresponding precursor substance which can be converted into ammonia, to form elementary nitrogen (N) and water ($H_2O$). Here, use is preferably made of aqueous urea solutions. The urea solution is hydrolyzed by means of a hydrolysis catalytic converter, or directly on the SCR catalytic converter, to form ammonia and carbon dioxide. For this purpose, the urea solution is injected into the exhaust-gas stream upstream of the hydrolysis catalytic converter or of the SCR catalytic converter by means of special dosing systems. Here, reliable supply and precise dosing of the reducing agent must be ensured.

In the event of underdosing of the reducing agent, efficient removal of nitrogen oxides from the exhaust gas is not possible. On the other hand, overdosing of reducing agent can result in undesired emissions, for example of ammonia—a so-called breakthrough of reducing agent.

To attain the highest possible rate of conversion of the nitrogen oxides, there is generally a need for the reducing agent that is used to be dosed in a precise manner in accordance with demand, wherein a breakthrough of reducing agent should as far as possible be prevented.

In the case of liquid reducing agent such as the customary aqueous urea solutions, the dosing can be performed by means of a dosing valve or injector. The actuation time and thus the opening time of the injector are in this case definitive of the amount of reducing agent supplied to the exhaust-gas aftertreatment system.

In the case of modern, air-free SCR systems, ever higher injection pressures are used. For the generation of the corresponding pressure, the injector is connected via a line to a reducing agent pump. A higher injection pressure has the advantage that the atomization is finer and thus the ammonia can be more easily released from the normally aqueous reducing agent solution.

On the other hand, owing to the ever higher pressures, the risk of leakage at the injector, or leaks occurring in the line system between the outlet of the reducing agent pump and the injector, is increased. Since the reducing agent pump is generally arranged close to or in a tank which stores the reducing agent, and the injector is assigned to the exhaust-gas aftertreatment system, there are resulting long line distances, in some cases of several meters, between the reducing agent pump and injector, such that, owing to aging and mechanical loading as a result of arrangement normally along the underbody of the vehicle, the risk of leakage in this line branch, which is normally formed from plastic hoses, is increased. Also, the injector is subject to increased loads owing to its exposed position in the exhaust tract of the internal combustion engine. A situation may for example arise in which the nozzle of the injector no longer fully closes owing to coking, and thus correct metering of the reducing agent is no longer ensured.

Since such leaks have a direct effect on the pollutant emissions of the vehicle, said components must be checked with regard to correct functioning.

DE 10 2009 014 809 B3 discloses a method and a device for checking an injection device for introducing a catalytically oxidizable reducing agent into an exhaust tract of an internal combustion engine at a location upstream of an oxidation catalytic converter and of a particle filter. In the overrun cut-off operating state of the internal combustion engine, in which the fuel injection of the internal combustion engine is deactivated and no regeneration of the particle filter is demanded, the exhaust-gas temperature downstream of the oxidation catalytic converter is detected and stored. The injection device, which is held closed, is subjected, for a predefined time period, to a pressure which is higher than the pressure during the injection of the reducing agent with the injection device open. After the time period has elapsed, the exhaust-gas temperature downstream of the oxidation catalytic converter is detected, and the two exhaust-gas temperatures are compared with one another. The injection device is then evaluated with regard to its leak-tightness in a manner dependent on the result of the comparison. The injection device is regarded as being defective if the value of the exhaust-gas temperature after the pressure increase is higher than the value of the exhaust-gas temperature before the pressure increase.

DE 10 2010 029 852 A1 describes a method for the diagnosis of an exhaust-gas purification device, which can be controlled by means of a control signal, for the purification of an exhaust-gas stream of an internal combustion engine by means of selective catalytic reduction. To permit improved diagnosis, it is provided that:

a volume flow of a reducing agent required for the selective catalytic reduction is delivered by means of a pump device to a dosing device which is connected downstream of the pump device and assigned to the exhaust-gas stream, the control signal of the exhaust-gas purification device is changed or is adjusted in a defined manner, a reaction of a pressure of the volume flow between the pump device and the dosing device to the change in the control signal is determined, and the reaction is interpreted for the purposes of diagnosing the exhaust-gas purification device.

SUMMARY

One embodiment provides a method for checking the functionality of hydraulic components in an exhaust-gas aftertreatment system, which operates with liquid reducing agent, of an internal combustion engine, having a reducing agent pump which is driven by means of an electric motor and which delivers reducing agent from a reducing agent storage tank via a reducing agent line to a reducing agent injector, which is held closed, wherein: (a) the reducing agent pump is activated for a first predetermined time period, (b) during said first time period, the electrical current consumed by the electric motor is detected, (c) after a predetermined standstill time of the reducing agent pump has expired, said reducing agent pump is activated again for a second time period which is identical to the first time period, (d) during said second time period, the electrical current consumed by the electric motor is detected, (e) the electrical currents detected during the two time periods are compared with one another, and (f) the hydraulic components downstream of the reducing agent pump are evaluated with regard to their functionality on the basis of the result of the comparison in step (e).

In a further embodiment, the respective maximum values of the electrical current are detected and compared with one another.

In a further embodiment, a differential value is formed from the maximum values of the electrical current, and a leak of at least one of the hydraulic components downstream of the reducing agent pump is identified if the differential value is lower than a predefined reference value.

In a further embodiment, the respective mean values of the electrical current are detected and compared with one another.

In a further embodiment, a differential value is formed from the mean values of the electrical current, and a leak of at least one of the hydraulic components downstream of the reducing agent pump is identified if the differential value is lower than a predefined reference value.

In a further embodiment, the reference values are determined experimentally for a leak-free exhaust-gas aftertreatment system and are stored in a value memory of a dosing control unit of the exhaust-gas aftertreatment system.

In a further embodiment, a reciprocating-piston pump is used as a reducing agent pump, and the time periods correspond in each case to the duration of a single pump stroke.

In a further embodiment, a frequency counter is activated which counts the number of undershootings of the differential value of the reference value, and the hydraulic component is evaluated as exhibiting leakage only if the number of undershootings exceeds a predefined maximum frequency.

In a further embodiment, when a leak of a hydraulic component is identified, an entry is recorded in a fault memory of a dosing control unit of the exhaust-gas aftertreatment system, and/or a visual and/or acoustic warning message is output to the driver of the motor vehicle that is driven using the internal combustion engine.

Another embodiment provides a method for checking the functionality of hydraulic components in an exhaust-gas aftertreatment system, which operates with liquid reducing agent, of an internal combustion engine, having a reducing agent pump which is driven by means of an electric motor and which delivers reducing agent from a reducing agent storage tank via a reducing agent line to a reducing agent injector, which is held closed, wherein the device is designed for carrying out a method as described above.

BRIEF DESCRIPTION OF THE DRAWINGS

Example embodiments of the invention are explained in more detail below with reference to the drawings, in which.

DETAILED DESCRIPTION

Figure 1:
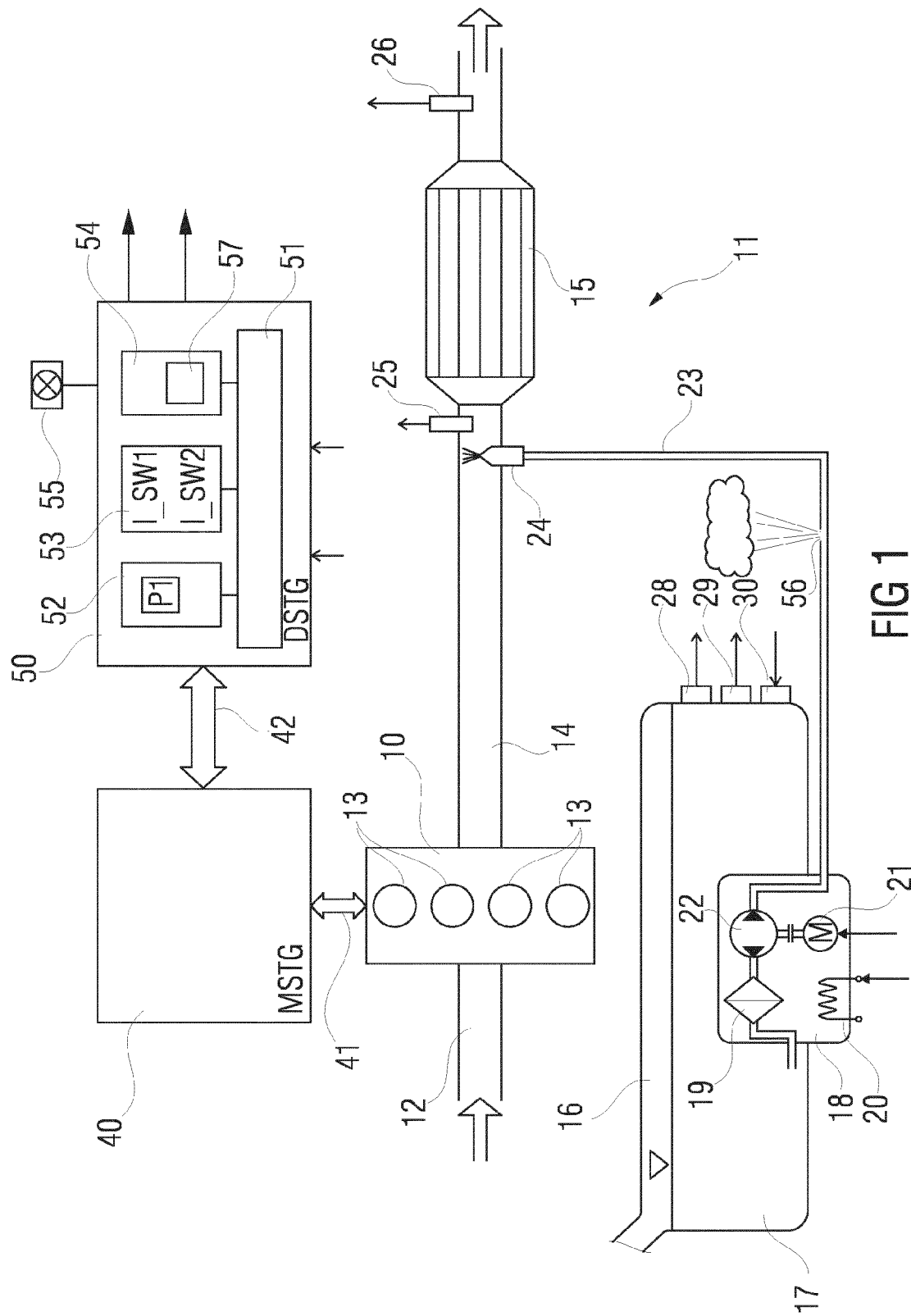
FIG. 1 shows a highly simplified block circuit diagram of an internal combustion engine with an SCR exhaust-gas aftertreatment system and associated control device.

Embodiments of the present invention provide a method and a device with which the functionality of hydraulic components in an exhaust-gas aftertreatment device, which comprises an electrically driven reducing agent pump, of a motor vehicle can be checked in a simple and inexpensive manner.

Embodiment of the invention are based on the realization that there is a correlation between the electrical current consumed by an electric motor which drives the reducing agent pump and the pressure that is built up by the reducing agent pump.

Some embodiments provide a method for checking the functionality of hydraulic components in an exhaust-gas aftertreatment system, which operates with liquid reducing agent, of an internal combustion engine, having a reducing agent pump which is driven by means of an electric motor and which delivers reducing agent from a reducing agent storage tank via a reducing agent line to a reducing agent injector, which is held closed. The reducing agent pump is activated for a first predetermined time period, and during said first time period, the electrical current consumed by the electric motor is detected. After a predetermined standstill time of the reducing agent pump has expired, said reducing agent pump is activated again for a second time period which is identical to the first time period, and during said second time period, the electrical current consumed by the electric motor is detected. The electrical currents detected during the two time periods are compared with one another, and the hydraulic components downstream of the reducing agent pump are evaluated with regard to their functionality on the basis of the result of the comparison.

With the specified checking method, it is possible both for the functionality of a reducing agent line situated downstream of the reducing agent pump and also the reducing agent injector to be evaluated with regard to leak-tightness.

By detection and evaluation of the electrical current of the electric motor that drives the reducing agent pump, it is possible to dispense with any use of sensors, such as for example pressure and throughflow sensors. Through the omission of additional sensors, connecting cables are dispensed with, as is the interface thereof with respect to a dosing control unit which controls/regulates the exhaust-gas aftertreatment system.

In one embodiment, the maximum values of the electrical current that occur during the two time periods are detected and compared with one another. This is conducive to particularly simple measurement value determination.

In another embodiment, the mean values of the electrical current that occur during the two time periods are detected and compared with one another. This is conducive to particularly reliable measurement value determination.

In a further embodiment, with regard also to speed and low computing power, such a diagnosis can be performed if a differential value is formed in each case from the maximum values of the electrical current and from the mean values of the electrical current, respectively, and a leak of at least one of the hydraulic components downstream of the reducing agent pump is identified if the respective differential value is lower than a predefined reference value.

Further advantages of the method according to the invention will emerge from the description of an exemplary embodiment and from the drawing.

FIG. 1 shows, in a schematic illustration, an internal combustion engine 10 which operates at least partially with an excess of air and which has an associated exhaust-gas aftertreatment system 11. Here, only those components which are required for understanding the disclosed embodiments of invention are illustrated. In particular, the fuel supply system of the internal combustion engine 10 has been omitted.

The fresh air required for the combustion is supplied to the internal combustion engine 10 via an intake tract 12. The exhaust gas that is generated in cylinders 13 of the internal combustion engine 10 during the combustion of the fuel-air mixture flows via an exhaust line 14 to the exhaust-gas aftertreatment system 11, and from the latter into the atmosphere via a silencer (not illustrated). During the operation of the internal combustion engine 10, the exhaust gas flows through the exhaust line 14 in the direction of the arrow shown.

For the control and regulation of the internal combustion engine 10, an electronic engine control unit (ECU) 40 known per se is connected via a data and control line (merely schematically illustrated here) or via an electrical bus system 41 to electrical/electronic/electromechanical components of the internal combustion engine 10. For example, signals of sensors (temperature sensors for intake air, charge air in the case of a supercharged internal combustion engine, coolant; load sensor, rotational speed sensor, exhaust-gas sensors etc.) and signals for actuators and control elements (for example injection valves, control elements etc.) are transmitted between the internal combustion engine 10 and the engine control unit 40 via said data and control line or via said bus system 41.

The exhaust-gas aftertreatment system 11 comprises an SCR (selective catalytic reduction) catalytic converter 15 which is arranged in the exhaust line 14 and which serves as a reduction catalytic converter and which comprises for example multiple catalytic converter units connected in series. Upstream of the SCR catalytic converter 15 there may additionally be arranged an oxidation catalytic converter (not illustrated). Said oxidation catalytic converter can oxidize the NO to form $NO_X$ and thus realize a ratio of NO to $NO_X$ which is particularly expedient for the operation of the SCR catalytic converter 15 for selective catalytic reduction.

The exhaust-gas aftertreatment system 11 furthermore has a reducing agent storage tank 16 which has a closable filling opening and in which there is stored a liquid reducing agent 17 which is used for exhaust-gas aftertreatment purposes. In this exemplary embodiment, aqueous urea solution is used as reducing agent.

On or in the reducing agent storage tank 16 there is arranged a pump module 18 into which a filter 19, an electrical heating device 20 and a reducing agent pump 22, which is driven by means of an electric motor 21, are integrated. As a reducing agent pump 22, use may be made of any type of electrically driven pump which, in the deactivated state, exhibits a blocking action counter to the delivery direction of the reducing agent 17, such that no backflow of reducing agent 17 into the reducing agent storage tank 16, and thus no pressure dissipation at the pump itself and in the hydraulic components connected to a pump outlet, can occur while the pump is at a standstill. For this purpose, use may preferably be made of an electrically driven piston pump with a check valve.

The reducing agent pump 22 generates the required reducing agent pressure and is connected by means of a reducing agent line 23 to a reducing agent injector 24 (hereinafter referred to as injector for short) which serves as a dosing device for the reducing agent 17 and which can be controlled by means of electrical signals. Here, the injector is arranged in the exhaust line 14 at a location upstream of the SCR catalytic converter 15 in order to introduce reducing agent into the exhaust line 14 as required.

As an injector 24, use may preferably be made of a conventional electrically controllable fuel injection valve, the structural design of which (reducing agent-resistant material, nozzle opening) is adapted to the reducing agent that is used and to the prevailing pressures (typical values are approximately 5-10 bar).

For the detection of the temperature of the exhaust gas, a temperature sensor 25 is provided in the exhaust line 14, likewise at a location upstream of the SCR catalytic converter 15. A $NO_X$ sensor 26 for detecting the $NO_X$ concentration in the exhaust gas is connected downstream of the SCR catalytic converter 15.

For the operation of the exhaust-gas aftertreatment system 11, an electronic dosing control unit (DCU) 50 is provided which is in the form of a dedicated functional unit and which performs all of the functions required for the delivery, control and/or regulation and dosing of the reducing agent 17. For this purpose, the dosing control unit 50 is supplied with not only the signals from the sensors 25, 26 mentioned above but also signals from further sensors that are required for the operation of the exhaust-gas aftertreatment system 11. In particular, the signals from sensors 28, 29, assigned to the reducing agent storage tank 16, for the fill level and/or the temperature of the reducing agent 17 in the reducing agent storage tank 16 are supplied. The dosing control unit 50 also controls an electric heating device 30 arranged in or on the reducing agent storage tank 16, such that reliable dosing is ensured even at temperatures below the freezing point of the reducing agent 17.

The dosing control unit 50 is connected to the engine control unit 40, for reciprocal data transfer, via a data and control line or an electrical bus system 42. Via the bus system 42, those operating parameters of the internal combustion engine 10 which are relevant for the calculation of the amount of reducing agent 17 to be dosed, for example engine rotational speed, air mass, fuel mass, control travel of an injection pump, exhaust-gas mass flow, operating temperature, charge-air temperature, start of injection etc., are transmitted to the dosing control unit 50.

Dosing control units of said type, which generally comprise one or more microprocessors, are known per se, such that only the construction that is relevant in connection with the invention, and the mode of operation thereof, will be discussed below.

The dosing control unit 50 has a computer (processor) 51 which is coupled to a program memory 52. In the program memory 52, there is implemented in software form inter alia a preferably characteristic-map-based function for the calculation, on the basis of the signal supplied to the dosing control unit 50, of the amount of reducing agent 17 to be injected.

Furthermore, in the program memory 52, there is stored a control program P1 which executes a method for checking the functionality of hydraulic components (reducing agent line 23, injector 24) of the exhaust-gas aftertreatment system 11, as will be explained in yet more detail below on the basis of a diagnostic sequence in FIG. 2.

Figure 2:
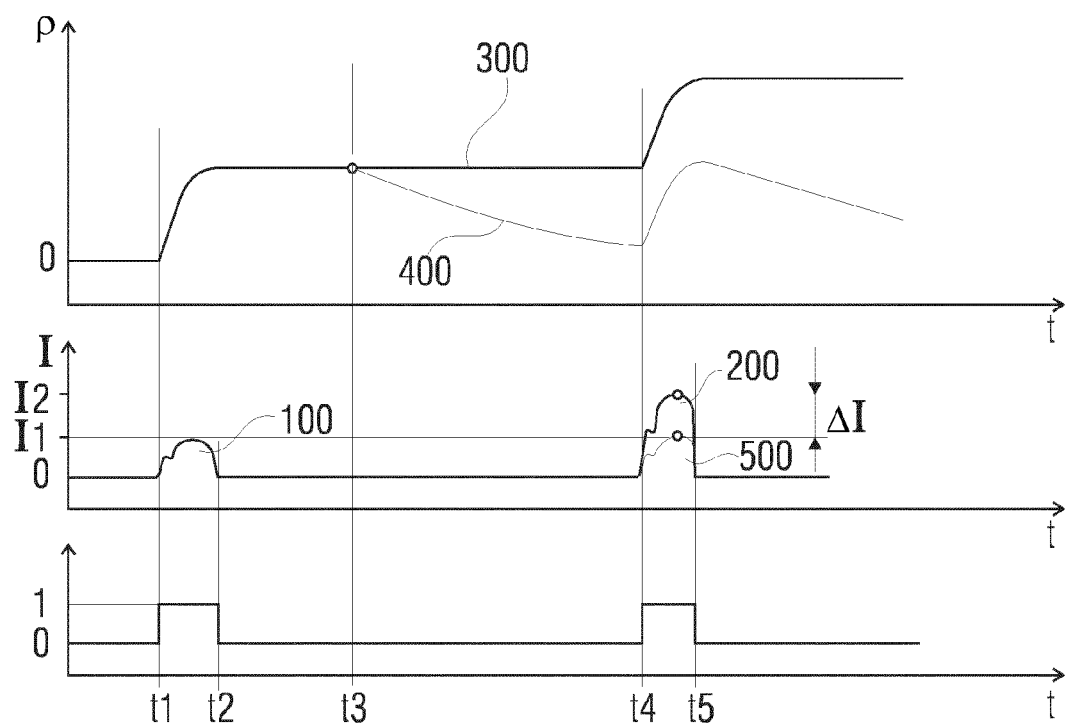
FIG. 2 shows a diagram with profiles with respect to time of parameters which are used for the checking of the SCR exhaust-gas aftertreatment system.

Furthermore, the computer 51 is coupled to a value memory (data memory) 53 in which there are stored inter alia characteristic maps, parameter values and reference values which are required for the execution of the programs mentioned above, and the importance of which will likewise be explained in more detail on the basis of the description of FIG. 2.

Furthermore, the computer 51 is coupled to a fault memory 54 for storing and reading out different diagnostic results, in particular diagnostic results from a method for checking the functionality of hydraulic components of the exhaust-gas aftertreatment system 11. Negative diagnostic results can also, as well as being stored in the fault memory 54, be acoustically and/or visually transmitted to the driver of the motor vehicle that is driven using the internal combustion engine 10. For this purpose, a fault output unit 55 is provided which is connected to the dosing control unit 50. The fault memory 54 is also assigned a frequency counter 57 which adds up the number of fault results that occur.

For the regulation of the pressure of the reducing agent 17 within the exhaust-gas aftertreatment system 11, either the signal of a pressure sensor may be used, or the pressure is estimated on the basis of a measurement of the electrical current of the electric motor 21, which drives the reducing agent pump 22, during a pump stroke. The pressure of the reducing agent 17 is substantially a function of the electrical current I consumed by the electric motor 21, because said electrical current represents a measure for the force with which, for example in the case of a piston pump, the pump piston must be actuated in order to deliver additional reducing agent 17.

The correlation between the electrical current I consumed by the electric motor 21 during a pump stroke and the pressure p of the reducing agent 17 that is generated in the process is taken into consideration for checking the functionality of hydraulic components downstream of the reducing agent pump 22, as will be explained on the basis of the description of FIG. 2.

The function check is performed in a time window in which no dosing of reducing agent 17 takes place, that is to say the injector 24 is closed, for example while the internal combustion engine 10 is at a standstill. A prerequisite for this function check is that correct operation of the reducing agent pump 22 is ensured. This may be detected in advance by way of known diagnostic routines.

The lower diagram of FIG. 2 shows the activation and deactivation times of the reducing agent pump 22. At a time point t1, the reducing agent pump 22 is activated, that is to say voltage is applied to the electric motor 21, and the reducing agent pump is deactivated again at a time point t2. The time period t2-t1 corresponds in this case to a pump stroke of the reducing agent pump 22. A typical time profile with respect to time of the electrical current I1 consumed by the electric motor 21 in the process is illustrated in the middle diagram of FIG. 2 by way of a solid line and is denoted by the reference sign 100. The maximum value of the electrical current I1 is detected by the dosing control unit 50 and stored in non-volatile form in the value memory 53.

The pressure level of the reducing agent 17 is increased as a result of the pump stroke. A profile with respect to time of the pressure p is illustrated by way of example in the upper diagram of FIG. 2 by a solid line and is denoted by the reference sign 300. Since no reducing agent 17 is injected during the function check, the pressure should, in the case of a fault-free system, remain constant until a further pump stroke takes place.

At a time point t4, the reducing agent pump 22 is activated again, that is to say voltage is applied to the electric motor 21 again, and said reducing agent pump is deactivated again at a time point t5. The time period t5-t4 corresponds in this case to the next pump stroke of the reducing agent pump 22 and corresponds to the time period t2-t1. If the hydraulic components downstream of the reducing agent pump 21 are free from leakage, the electrical current I2 consumed by the electric motor 21 in the process should be significantly higher than during the preceding pump stroke, because a certain pressure level has already been built up owing to the first pump stroke.

The pressure p of the reducing agent 17 increases further from time point t4 onward before settling at a constant value after time point t5 is reached.

A typical profile with respect to time of the electrical current I2 consumed by the electric motor 21 during the second pump stroke, that is to say during the time period t5-t4, in the case of a leakage-free system is illustrated in the right-hand part of the middle diagram of FIG. 2 and is denoted by the reference sign 200.

The maximum value of the electrical current I2 during the second pump stroke is likewise detected by the dosing control unit 50 and stored in non-volatile form in the value memory 53.

The control program P1 in the program memory 52 of the dosing control unit 50 compares the respective maximum values detected during the first and second pump strokes for the electrical current I1, I2, and the hydraulic components 23, 24 situated downstream of the reducing agent pump 22 are evaluated with regard to their functionality in a manner dependent on the result of the comparison.

One possibility for the evaluation of the two maximum values of the electrical current I1, I2 involves calculating the difference between the two maximum values $\Delta I = I2 - I1$ and comparing said differential value $\Delta I$ with a reference value I_SW1 stored in the value memory 53, said reference value being characteristic of a fault-free system. Said reference value I_SW1 may for example be determined experimentally.

If the differential value $\Delta I$ lies below the reference value I_SW1, the electric motor 21 consumes a reduced current during the pump stroke within the time period t5-t4, and it is concluded that there is a lower flow resistance in relation to the fault-free normal state and thus an excessively low pressure of the reducing agent 17 downstream of the reducing agent pump 22, and a leak in hydraulic components 23, 24 situated downstream of the reducing agent pump 22 is identified.

The reason for this may be a leak in the reducing agent line 23, as indicated in FIG. 1 by a leakage point 56, or an at least partially loosened or loose connection between the reducing agent line 23 and the injector 24, or a leak of the injector 24 itself.

Since the nozzle opening of the injector 24 generally protrudes into the exhaust gas stream, fouling and/or coking of the nozzle opening may occur under some circumstances, with the result that the injector 24 can no longer be fully closed. Crystallization of the reducing agent 17 can also lead to permanent leakage occurring at the injector 24.

In the upper diagram of FIG. 2, a dash-dotted curve 400 is used to illustrate how the profile of the pressure p changes if leakage occurs at a time point t3 in the time period between two successive pump strokes of the reducing agent pump 22. From said time point t3 onward, the pressure falls, and said pressure rises again during the subsequent pump stroke, but not to the value that would be expected for a fault-free system. Since, owing to the leakage, the piston of the reducing agent pump 22 is opposed by a low force, the electric motor 21 of the reducing agent pump 22 consumes a lower current, as illustrated by way of example in the right-hand part of the middle diagram of FIG. 2, likewise by way of a dash-dotted curve 500.

To increase diagnostic certainty, a one-off undershooting of the reference value I_SW1 does not immediately lead to a fault entry being recorded in the fault memory 54 and the fault output unit 55 being actuated; rather, the undershooting of the reference value I_SW is subjected to statistical evaluation, for example so-called fault debouncing of any known type. For this purpose, the fault memory is assigned a frequency counter 57 which adds up the number of fault events that occur, and the hydraulic component 23, 24 is evaluated as having a leak only when the number of undershootings exceeds a predefined maximum frequency.

In the exemplary embodiment shown and described, the dosing control unit 50 of the exhaust-gas aftertreatment system 11 and the engine control unit 40 of the internal combustion engine 10 are illustrated as separate functional units that communicate with one another via a control and data line or via a bus system 42. This solution with peripheral control units 40, 50 is suitable in particular for motor vehicles in which the exhaust-gas aftertreatment system 11 is retrofitted.

It is however also possible for the functionality of the dosing control unit 50 to be integrated into the engine control unit 40 of the internal combustion engine 10. In this case, the signals from the sensors 25, 26, 28, 29 provided in the exhaust-gas aftertreatment system 11 are supplied directly to the engine control unit 40, and the latter directly controls the control elements such as the reducing agent pump 22 and the injector 24.

LIST OF TERMINOLOGY AND REFERENCE SIGNS

10 Internal combustion engine
11 Exhaust-gas aftertreatment system
12 Intake tract
13 Cylinder
14 Exhaust line
15 SCR catalytic converter
16 Reducing agent storage tank
17 Reducing agent, aqueous urea solution
18 Pump module
19 Filter
20 Electric heating device of the pump module
21 Electric drive motor of the reducing agent pump
22 Reducing agent pump
23 Reducing agent line
24 Reducing agent injector, injector
25 Exhaust gas temperature sensor
26 $NO_X$ sensor
28 Fill level sensor
29 Temperature sensor for the reducing agent
30 Electric heating device of the reducing agent storage tank
40 Engine control unit, ECU
41, 42 Data and control line, bus system
50 Dosing control unit, DCU
51 Computer (processor)
52 Program memory
53 Value memory (data memory)
54 Fault memory
55 Fault output unit
56 Leakage point
57 Frequency counter
100 Current profile with respect to time during a pump stroke in a fault-free system
200 Current profile with respect to time during the subsequent pump stroke in a fault-free system
300 Pressure profile with respect to time in a fault-free system
400 Pressure profile with respect to time in a leaking system
500 Current profile with respect to time during the subsequent pump stroke in a leaking system
t Time
t1-t5 Time points
p Pressure of the reducing agent in the exhaust-gas aftertreatment system
P1 Control program
I Electrical current
I1 Maximum value of the electrical current I during a first pump stroke of the reducing agent pump
I2 Maximum value of the electrical current I during a subsequent pump stroke of the reducing agent pump
ΔI Difference in the current values in two successive pump strokes
I_SW1, I_SW2 Reference value for the difference in the current values

What is claimed is:

1. A method for checking a functionality of hydraulic components in an exhaust-gas aftertreatment system of an internal combustion engine of a vehicle, which exhaust-gas aftertreatment system operates with liquid reducing agent and includes a reducing agent pump that is driven by an electric motor and which delivers reducing agent from a reducing agent storage tank via a reducing agent line to a reducing agent injector, which is held closed, the method comprising:
    activating the reducing agent pump for a first predetermined time period,
    detecting a measure of electrical current consumed by the electric motor during said first time period,
    detecting a first maximum value of the electrical current detected during the first time period,
    after a predetermined standstill time of the reducing agent pump has expired, activating said reducing agent pump again for a second time period identical to the first time period,
    detecting a measure of electrical current consumed by the electric motor during said second time period,
    detecting a second maximum value of the electrical current detected during the second time period,
    comparing the electrical current detected during the first time period to the electrical current detected during the second time period,
    comparing the first and second maximum values of the electrical current,
    determining a differential value from the maximum values of the electrical current, and
    activating a frequency counter that counts a number of undershootings of the differential value of the reference value, and
    identifying a leak in one of the hydraulic components in response to the number of undershootings exceeding a predefined maximum frequency.

2. The method of claim 1, comprising:
    detecting a first mean value of the electrical current detected during the first time period, detecting a second mean value of the electrical current detected during the second time period, and comparing the first and second mean values of the electrical current.

3. The method of claim 2, comprising:

determining a differential value from the mean values of the electrical current, and identifying a leak in at least one hydraulic component downstream of the reducing agent pump in response to determining that the differential value is lower than a predefined reference value.

4. The method of claim 1, wherein the reference value is determined experimentally for a leak-free exhaust-gas aftertreatment system and stored in a value memory of a dosing control unit of the exhaust-gas aftertreatment system.

5. The method of claim 1, wherein a reciprocating-piston pump is used as a reducing agent pump, and each of the first and second time periods corresponds to a duration of a single pump stroke.

6. The method of claim 1, comprising:

in response to identifying a leak in the hydraulic component, performing at least one of:

recording an entry in a fault memory of a dosing control unit of the exhaust-gas aftertreatment system, and outputting to a driver of the vehicle at least one of a visual warming message and an acoustic warning message.

7. A control device for checking a functionality of hydraulic components in an exhaust-gas aftertreatment system of an internal combustion engine of a vehicle, which exhaust-gas aftertreatment system operates with liquid reducing agent and includes a reducing agent pump that is driven by an electric motor and which delivers reducing agent from a reducing agent storage tank via a reducing agent line to a reducing agent injector, which is held closed, wherein the control device comprises:

a processor; and computer instructions stored in a non-transitory computer-readable medium and executable by the processor to:

activate the reducing agent pump for a first predetermined time period, detect a measure of electrical current consumed by the electric motor during said first time period, detect a first maximum value of the electrical current detected during the first time period, after a predetermined standstill time of the reducing agent pump has expired, activate said reducing agent pump again for a second time period identical to the first time period, detect a measure of electrical current consumed by the electric motor during said second time period, detect a second maximum value of the electrical current detected during the second time period, compare the electrical current detected during the first time period to the electrical current detected during the second time period, compare the first and second maximum values of the electrical current, determine a differential value from the maximum values of the electrical current, activate a frequency counter that counts a number of undershootings of the differential value of the reference value, and identify a leak in one of the hydraulic components in response to the number of undershootings exceeding a predefined maximum frequency.

8. The control device of claim 7, wherein the computer instructions are further executable to:

detect a first mean value of the electrical current detected during the first time period, detect a second mean value of the electrical current detected during the second time period, and compare the first and second mean values of the electrical current.

9. The control device of claim 8, wherein the computer instructions are further executable to:

determine a differential value from the mean values of the electrical current, and identify a leak in at least one hydraulic component downstream of the reducing agent pump in response to determining that the differential value is lower than a predefined reference value.

10. The control device of claim 7, wherein the reference value is determined experimentally for a leak-free exhaust-gas aftertreatment system and stored in a value memory of a dosing control unit of the exhaust-gas aftertreatment system.

11. The control device of claim 7, wherein a reciprocating-piston pump is used as a reducing agent pump, and each of the first and second time periods corresponds to a duration of a single pump stroke.

12. The control device of claim 7, wherein the computer instructions are further executable to:

in response to identifying a leak in the hydraulic component, perform at least one of:

recording an entry in a fault memory of a dosing control unit of the exhaust-gas aftertreatment system, and outputting to a driver of the vehicle at least one of a visual warming message and an acoustic warning message.

* * * * *